United States Patent
Hemmings et al.

(10) Patent No.: US 7,686,856 B2
(45) Date of Patent: Mar. 30, 2010

(54) METHOD AND APPARATUS FOR PRODUCING SYNTHESIS GAS

(75) Inventors: John William Hemmings, Katy, TX (US); Leo Bonnell, Houston, TX (US); Earl T. Robinson, Mentor, OH (US)

(73) Assignee: Praxair Technology, Inc., Danbury CT ( * ) Notice: Subject to any disclaimer, the term of this patent is extended or adjusted under 35 U.S.C. 154(b) by 820 days.

(21) Appl. No.: 11/454,885

(22) Filed: Jun. 19, 2006

(65) Prior Publication Data

US 2007/0289215 A1 Dec. 20, 2007

(51) Int. Cl.
*C01B 3/32* (2006.01)
(52) U.S. Cl. .................. 48/198.7; 48/61; 48/127.1; 48/127.9; 48/127.5; 48/127.7; 48/198.5; 48/198.6; 48/76; 48/197 R; 423/651; 423/652; 423/648.1; 422/188; 422/189; 422/194; 422/190
(58) Field of Classification Search .................. 422/211, 422/188–189, 193, 236, 191; 48/127.9, 127.3, 48/214 R, 215; 429/19–20
See application file for complete search history.

(56) References Cited

U.S. PATENT DOCUMENTS

| | | | |
|---|---|---|---|
| 4,048,029 A | 9/1977 | Seitzer | 204/129 |
| 4,793,323 A | 12/1988 | Guida et al. | 126/263 |
| 5,938,822 A | 8/1999 | Chen et al. | 96/11 |
| 6,077,323 A | 6/2000 | Nataraj et al. | 48/198.1 |
| 6,153,163 A | 11/2000 | Prasad et al. | 423/246 |
| 6,200,541 B1 | 3/2001 | Kleefisch et al. | 422/211 |
| 6,562,104 B2 | 5/2003 | Bool, III et al. | 95/54 |
| 6,695,983 B2 | 2/2004 | Prasad et al. | 252/373 |
| 7,261,751 B2* | 8/2007 | Dutta et al. | 48/198.1 |
| 2004/0159046 A1* | 8/2004 | Komaki et al. | 48/127.9 |
| 2005/0061633 A1 | 3/2005 | Vetter | 198/834 |

* cited by examiner

*Primary Examiner*—Jennifer Michener
*Assistant Examiner*—Kaity V. Handal
(74) *Attorney, Agent, or Firm*—David M. Rosenblum (57) ABSTRACT

A method and apparatus for reacting a hydrocarbon containing feed stream by steam methane reforming reactions to form a synthesis gas. The hydrocarbon containing feed is reacted within a reactor having stages in which the final stage from which a synthesis gas is discharged incorporates expensive high temperature materials such as oxide dispersed strengthened metals while upstream stages operate at a lower temperature allowing the use of more conventional high temperature alloys. Each of the reactor stages incorporate reactor elements having one or more separation zones to separate oxygen from an oxygen containing feed to support combustion of a fuel within adjacent combustion zones, thereby to generate heat to support the endothermic steam methane reforming reactions.

13 Claims, 8 Drawing Sheets

METHOD AND APPARATUS FOR PRODUCING SYNTHESIS GAS

U.S. GOVERNMENTAL INTEREST

This invention was made with United States Government support under Cooperative Agreement number DE-FC26-01NT41096 awarded by the U.S. Department of Energy, National Energy Technology Laboratory. The United States Government has certain rights in this invention.

FIELD OF THE INVENTION

The present invention relates to a method and apparatus for producing a synthesis gas in which a hydrocarbon containing stream and steam are reacted by steam methane reforming reactions conducted in reaction stages to produce the synthesis gas and the temperature within each of the reaction stages is controlled to minimize the use of expensive, high-temperature alloys. More particularly, the present invention relates to such a method and apparatus in which the reaction stages are heated by oxy-fuel combustion involving the use of oxygen transport membranes to supply the oxygen. Even more particularly, the present invention relates to such a method and apparatus in which each of the reaction stages employs oxygen transport membrane elements formed of flat plates to separate the oxygen.

BACKGROUND OF THE INVENTION

Synthesis gases containing hydrogen and carbon monoxide can be purified to produce hydrogen and carbon monoxide products. Additionally, synthesis gas can also be reacted to provide useful chemical composition such as methanol and as a feed to Fischer-Tropsch processes for the production of liquid fuels.

Typically, synthesis gas is produced by steam methane reforming reactions that are conducted by reacting steam and a hydrocarbon containing fuel in the presence of a catalyst to promote the reforming reaction. Since the reaction is endothermic, heat is supplied to sustain the reaction. Steam methane reformers are large complex devices in which a fuel is combusted in the presence of air in order to supply the endothermic heating requirements.

The use of oxygen transport membranes to supply oxygen within reforming reactions has also been proposed in the prior art. The advantage of such a reformer is that the oxy-fuel combustion can be conducted more compactly than air fired combustion and the oxygen is not generated in a separate plant such as one that employs cryogenic rectification. Moreover, the combustion products are principally carbon dioxide and water. The carbon dioxide can be sequestered for its collection or further use as a value-added product.

Oxygen transport membranes employ airtight-ceramic materials, typically perovskites, that exhibit oxygen ion conductivity at an elevated temperature and upon a driving force of an oxygen partial pressure differential on opposite sides of the membrane. In such a device, an oxygen containing feed, for instance air, is contacted on one side of the membrane often referred to as the cathode side. The oxygen ionizes by gaining electrons. The electrons are transported through the membrane material for such purposes. The oxygen ions are transported through the membrane material in a direction opposite to the electrons and emerge at the opposite side of the membrane that is conventionally referred to as the anode side. At the anode side, the oxygen recombines to produce the electrons that are to be transported through the membrane.

An example of the use of an oxygen transport membrane for the production of synthesis gas can be found in U.S. Pat. No. 6,077,323 in which an oxygen transport membrane is employed to separate oxygen from the air to produce oxygen within a reactant section. The permeated oxygen reacts with hydrocarbons within a natural gas and steam containing feed to supply heat to support the steam methane reforming reactions. Such a reactor is consequently known as an autothermal reformer.

The use of oxygen transport membranes within high temperature environments is problematical because the membrane tends to degrade over time and fail. In order to achieve sufficient oxygen flux, the oxygen transport membrane employs a thin dense layer that is supported on one or more porous layers. All layers are typically formed of ceramic materials. One problem that has been found to effect longevity is the fact that over time, the ceramic support will fail by the known action of creep.

Both U.S. Pat. Nos. 5,938,822 and 6,200,541 disclose the use of a metal support layer. The use of a metal support layer is particularly advantageous in that it helps solve yet another problem involving mounting the ion transport element while sealing the element to its mounting, for instance, a tubesheet of a reactor. Metals while not being brittle are also subject to creep at high temperatures. Additionally, in the pure oxygen and highly oxidative environment in which oxygen ion transport elements operate, metals also suffer failure due to oxidation.

In order to overcome durability limitations with respect to oxygen transport materials, it has been proposed in U.S. Pat. No. 6,695,983 to use the oxygen transport membrane at a lower temperature and as an initial stage of the generation of synthesis gas. Thereafter, in a conventional fired reformer located downstream of the oxygen transport membrane reactor, the remainder of the hydrocarbons are reacted with steam to produce the synthesis gas product.

In another attempt to make more durable oxygen transport membrane elements for use in reactors, high temperature alloys have been proposed such as oxide dispersed strengthened metals. As disclosed in U.S. Patent Application Pub. No. 2005/0061633, a composite oxygen ion transport element is disclosed that has a dense layer applied to a support layer having pores of cylindrical configuration. Additionally, a porous layer can be interposed between the dense layer and the support layer to distribute oxygen permeating through the dense layer to the pores of the support layer. The support layer is formed of the oxide dispersed strengthened metal. The problem with the use of such materials within reactors is that they are very expensive.

As will be discussed, the present invention provides a method and apparatus for producing synthesis gas in a reactor that allows the use of expensive high temperature alloys such as oxide dispersed strengthened metal to be utilized in a cost effective manner and that employs robust planar elements that have a wide applicability to any type of device utilizing an oxygen transport membrane.

SUMMARY OF THE INVENTION

The present invention provides a method of producing a synthesis gas product stream containing hydrogen and carbon monoxide. In accordance with the method, at least one hydrocarbon is reacted with steam in steam methane reforming reactions conducted within separate reaction stages to produce the synthesis gas product stream. The reaction stages contain catalytic reaction zones within which the steam methane reforming reactions are conducted, combustion zones located adjacent to the reaction zones, separation zones located adjacent to the combustion zones and oxygen transport membrane elements located between the separation zones and the combustion zones. A fuel is combusted within the combustion zones so that heat is provided to support endothermic heating requirements of the steam methane reforming reactions and operational temperature requirements of the oxygen transport membrane elements. An oxygen containing gas is introduced into the separation zones and the oxygen is separated from the oxygen containing gas by oxygen ion transport occurring within the oxygen transport membrane elements. This provides the oxygen to support the combustion of the fuel within the combustion zones.

Intermediate product streams produced through the steam methane reforming reactions are sequentially passed through the reaction stages. The synthesis gas product stream is discharged from a final of the reaction stages.

The temperature within each of the reaction stages is controlled by providing a sufficient number of the reaction stages so that at least the final of the reaction stages operates at a temperature range of between about 900° C. and about 1100° C. and at least one of the reaction stages, located upstream of the at least final reaction stage has an operational temperature that is less than the temperature range due to the consumption of the heat in the endothermic reactions occurring within the at least one of the reaction stages. This allows the use of the high temperature alloys within the final reaction stage or stages and less expensive materials within stages located upstream of the final stage or stages. Advantageously, either the fuel streams containing the fuel can be separately metered into the combustion zones of each of the reaction stages and/or the oxygen containing streams containing the oxygen containing gas can be separately metered into the separation zones of each of the reactions stages. The metering or control of the fuel or the oxygen allows a further degree of control to be exercised over the temperature distribution within the reaction stages to allow for the degree of conversion taking place within each of the reaction stages to be maximized within temperature constraints of the materials being used in each of the stages.

The combustion zones can be connected in series so that an exhaust stream comprising carbon dioxide, water and unburned fuel is discharged from a last of the combustion zones directly adjacent and opposite to the final of the reaction zones. The exhaust stream is introduced into an oxygen transport membrane combustor to combust the unburned fuel and thereby to produce a carbon dioxide and water containing stream containing additional carbon dioxide and additional water from the combustion of the unburned fuel. The carbon dioxide and water containing stream can then be cooled to condense the water and the water can be separated from the carbon dioxide and water containing stream to produce a carbon dioxide stream. The carbon dioxide can be separated from the carbon dioxide stream to produce a carbon dioxide product stream.

The synthesis gas stream can be cooled to condense a water content of the synthesis gas stream. The water content can be removed from the synthesis gas stream after having been cooled. Hydrogen can be separated from the synthesis gas stream after the water content has been removed to provide a hydrogen product stream and a tail gas stream. The tail gas stream can be utilized as part of the fuel.

The synthesis gas stream can be further subjected to a water-gas shift reaction to increase the hydrogen content thereof after having been partly cooled.

The oxygen containing gas after having passed through the separation zones can be collected to form a first retentate stream. A subsidiary oxygen containing stream can be introduced into the oxygen transport membrane combustor to form a second retentate stream. The first and second retentate streams are introduced into a combustor to generate a heated stream. The heated stream is subdivided to produce subsidiary heated stream that directly transfers heat to the reactant stream, the tail gas stream and part of the oxygen containing stream.

In another aspect, the present invention provides a reactor for conducting a steam methane reforming reaction. The reactor comprises a plurality of separate reaction stages to conduct steam methane reforming reactions thereby to produce the synthesis gas product stream. The reaction stages contain reactor elements that define catalytic reactions zones within which the steam methane reforming reactions are conducted, combustion zones located adjacent to the reaction zones for combusting a fuel, separation zones located adjacent to the combustion zones for passage of an oxygen containing gas and oxygen transport membrane elements located between the separation zones and the combustion zones for separating oxygen from the oxygen containing gas. The use of the oxygen transport membrane elements supplies the oxygen to the combustion zones to support the combustion of the fuel. The combustion of the fuel supplies heat to support the endothermic heating requirements of the steam methane reforming reactions that are to be conducted within the reaction zones and to maintain the oxygen transport membrane elements at an operational temperature. The reaction stages are connected in series so that intermediate product streams produced through the steam methane reforming reactions sequentially passes through the reaction stages. The synthesis gas product stream is discharged from a final of the reaction stages.

The reactor elements that are employed in at least the final of the reaction stages are fabricated from a higher temperature material capable of maintaining structural integrity within a temperature range of between about 900° C. and about 1100° C. The reactor elements employed in at least one of the reaction stages, located upstream of the at least final reaction stage, are fabricated from a lower temperature material capable of maintaining structural integrity below the temperature range, but not within the temperature range.

At least one of intermediate fuel inlets and intermediate oxygen containing gas inlets can be located between reaction stages for metering fuel flow rate of the fuel introduced into the combustion zone of each of the reaction stages or for separately metering gas flow rate of the oxygen containing gas introduced into the separation zones of each of the reaction stages, respectively, for further controlling temperature in each of the reaction stages.

As will be discussed, the higher temperature material can be an oxide dispersed strengthened metal and the lower temperature material can be a high temperature alloy.

Each of the reaction stages can include a housing having a chamber, an oxygen containing gas inlet, a retentate outlet, a fuel gas inlet, an exhaust, a reactant inlet, a reactant outlet and at least one of the reactor elements located within the reactor chamber containing at least one of the reaction zones and at least one of the combustion zones. The reactor element can be formed of at least three spaced parallel planar members to form the at least one of the combustion zones between a first planar member and a second planar member of the at least three planer members. The reactor element communicates between the fuel gas inlet and the exhaust. At least one of the reaction zones is provided between the second planar member and a third of the at least three spaced planar members and communicates between the reactant inlet and the reactant outlet and a set of supports separating the at least three parallel planar members. At least one of the separation zones is defined by part of the chamber and separated from the at least one combustion zone by the first planar member. The first planar member has spaced arrays of openings and regions of oxygen transport membrane material located on the at least one planar member and registry with the openings and within the at least one of the separation zones. This forms the oxygen transport membrane elements.

Preferably, a fourth planar member can be located adjacent to and spaced from the third planar member so that two of the combustion zones are located between the first and the second of the planar members and between the third planar member and the fourth planar member. The fourth planar member can have the same configuration as the first planar member and with further regions of oxygen transport membrane material located on the fourth planar member and in registry with the arrays of openings defined in the fourth planar member. This thereby forms two oxygen transport membrane elements by the first of the planar members and the fourth planar member. Two of the separation zones are formed within the chamber and are separated from the two combustion zones by the first planar member and the fourth planar member.

The first planar member, the second planar member, the third planar member and the fourth planar member can be retained within a rectangular frame. The second planar member and the third planar member can be connected at a first set of opposed edges thereof to a pair of opposed transverse members of the rectangular frame and sealed along a first set of lengthwise edges to form a tube of a rectangular cross-section. The pair of opposed transverse members have openings and communication with the reactant gas inlet and the reactant gas outlet. The first planar member and the fourth planar member can be retained along the second set of the opposed edges within slots of the opposed transverse member and sealed along lengthwise edges by elongated headers having openings and communication with the fuel gas inlet and the flue gas outlet. The supports can constitute pillar-like projections inherently formed with the first planar member, the second planar member, the third planar member and the fourth planar member.

The four spaced parallel, planar members and the pillar-like projections thereof that are utilized within the at least the final of the reaction stages can be formed from the higher temperature material and the higher temperature material can be the oxide dispersed strengthened metal. The four spaced parallel, planar members located within the at least one of the reaction stages and the pillar-like projections thereof, located upstream of the at least final reaction stage, can be fabricated from the lower temperature material and such lower temperature material can be a high temperature alloy.

In a further aspect, the present invention provides a reactor for conducting any type of catalyzed reaction that is endothermic and therefore requires heat to support the reaction. In this aspect of the present invention, the reactor includes a housing having a chamber, an oxygen containing gas inlet, a retentate outlet, a fuel gas inlet, an exhaust, a reactant inlet, a reactant outlet and at least one reactor element located within the chamber. The reactor element contains a reaction zone having a catalyst to promote the catalyzed reaction and two combustion zones.

The at least one reactor element is formed of four spaced parallel, planar members to define the two combustion zones between a first planar member and a second planar member and between the third planar member and the fourth planar member of the four planar members. The two combustion zones communicate between the fuel gas inlet and the exhaust. The reaction zone is defined between the second planar member and a third planar member. The reaction zone communicates between the reactant inlet and the reactant outlet. A set of supports integrally formed with each of the first planar member, the second planar member, the third planar member and the fourth planar member separating the four planar members.

At least two opposed separation zones are defined by part of the chamber and separated from one of the two combustion zones by the first planar member and the other of the two combustion zones by the fourth planar member. Each of the first planar member and the second planar member having spaced arrays of openings and regions of oxygen transport membrane material located on said first planar member and the second planar member in registry with said openings and within the at least one of the separation zones, thereby to form an oxygen transport membrane element to separate oxygen from an oxygen containing gas introduced into the separation zones. The separated oxygen provides the oxygen to the combustion zones to support the combustion of the fuel and to generate heat for the catalyzed reaction and the operational temperature requirements for the oxygen transport membrane materials.

As in the steam methane reformer reactor, discussed above, the first planar member, the second planar member, the third planar member and the fourth planar member can be retained within the rectangular frame and the supports can constitute the pillar-like projections integrally formed with the planar members. Additionally, the four spaced parallel, planar members and the pillar-like projections thereof can be formed from the oxide dispersed strengthened metal.

In yet another aspect the present invention provides an oxygen transport membrane element to separate oxygen from an oxygen containing gas that comprises a planar member having spaced arrays of openings and oxygen transport membrane material capable of conducting oxygen ions attached to and in registry with the spaced array of openings.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
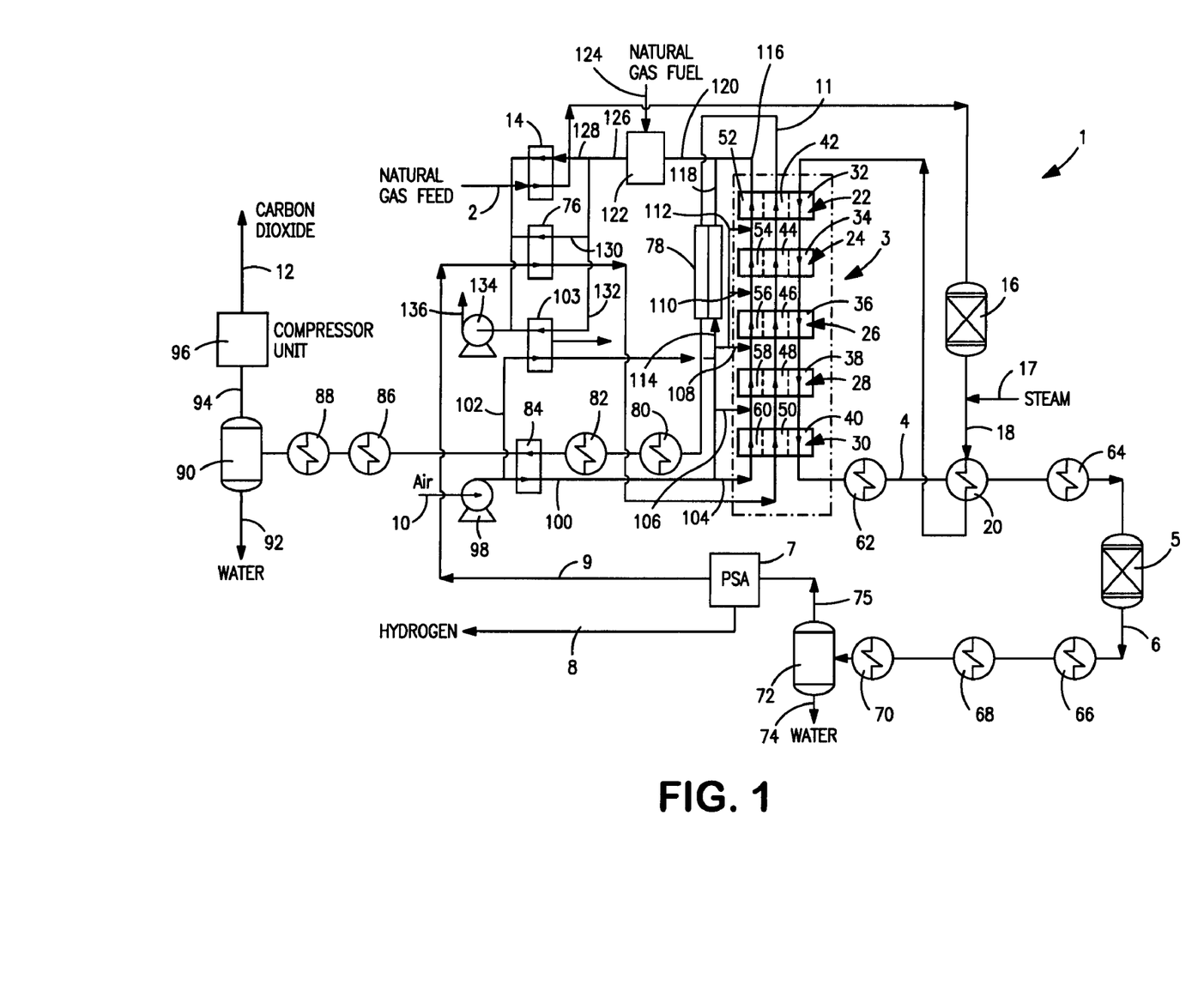
FIG. 1 is a schematic illustration of a hydrogen generation facility employing a method and reactor of the present invention.

With reference to FIG. 1, a hydrogen production facility 1 is illustrated that is used in the generation of hydrogen. However, it is understood that such environment for the present invention is for illustrative purposes only and that the present invention has a wider applicability.

Briefly, a hydrocarbon containing stream 2 that as illustrated can be natural gas, but potentially any stream containing one or more hydrocarbons to be subjected to steam methane reforming reactions, is conducted to a reactor 3 to produce a synthesis gas stream 4 containing hydrogen, carbon dioxide, carbon monoxide, water and trace amounts of unreacted hydrocarbons. The hydrogen content of synthesis gas stream 4 is increased within a known water-gas shift reactor 5 and hydrogen is separated from the resulting shifted stream 6 in a known pressure swing adsorption unit 7 having beds of adsorbent, operating out of phase, to separate hydrogen from such stream and thereby to produce a hydrogen stream 8 and a tail gas stream 9.

Tail gas stream 9 is the sole fuel to be combusted within reactor 3 supported by an oxygen containing gas, illustrated as air stream 10 or other oxygen containing gas, for example, a compressed exhaust from a gas turbine. The combustion of tail gas stream 9 supports the endothermic reaction requirements of the known steam methane reforming reactions conducted within reactor 3. As will be discussed, the use of the tail gas allows high production and nearly perfect sequestration of the carbon dioxide produced by the combustion. However, other fuels could be used alone or in conjunction with tail gas stream 9. An exhaust stream 11 can be further treated to produce a carbon dioxide product stream 12.

Having generally described the hydrogen production facility 1, a more detailed description follows.

Hydrocarbon containing feed stream 2, typically enters at pressure, about 450 psig and is heated within a heat exchanger 14 to a temperature suitable for desulphurization, for example between about 260° C. and about 400° C., preferably 370° C. Although not illustrated, natural gas typically contains sulfur species and has been treated to convert such sulfur species to hydrogen sulphide in a known hydrotreater in which the sulfur species are hydrogenated to produce hydrogen sulfide. Hydrocarbon containing feed stream 2 would similarly be treated within a hydrotreater in that in the illustrated embodiment it is formed from natural gas. The resultant hydrogen sulphide is removed from hydrocarbon containing feed stream 2 in an adsorption bed 16 that is typically zinc oxide to absorb the hydrogen sulphide. The thus treated hydrocarbon containing feed stream 2 is then combined with a high pressure, superheated steam stream 17 to produce a reactant stream 18 that is fed into a mixed feed heater 20 to heat the reactant stream 18 to a temperature in a range of between about 482° C. and about 565° C., preferably, about 565° C. The reactant stream 18 is then fed into reactor 3 for conducting the steam methane reforming reactions.

Reactor 3 is illustrated as having 5 separate stages 22, 24, 26, 28 and 30. Reactions stages 22, 24, 26, 28 and 30 contain catalytic reaction zones 32, 34, 36, 38 and 40 that contain a steam methane reforming catalyst to conduct a series of steam methane reforming reactions. The reaction stages 22, 24, 26, 28 and 30 also contain combustion zones 42, 44, 46, 48 and 50 in which tail gas stream 9 as a fuel is combusted to generate heat to support the endothermic reforming reactions that are being conducted within reaction zones 32, 34, 36, 38 and 40.

The combustion of the fuel is supported with the use of essentially pure oxygen that is produced within separation zones 52, 54, 56, 58 and 60 by separation of oxygen from oxygen containing feed stream 10 which can be air. While the use of oxygen transport membrane elements will be described in more detail hereinafter, such elements are located between combustion zones 42, 44, 46, 48 and 50 and separation zones 52, 54, 56, 58 and 60.

Synthesis gas stream 4 emerges from reactor 3 at essentially the same conditions as a conventionally fired steam methane reformer that is set forth in the example below. The synthesis gas stream 4 is successively cooled within heat exchangers 62, 20 and 64 to a temperature that is suitable for a water-gas shift reaction in which steam is reacted with carbon monoxide to create further hydrogen and further carbon dioxide. The synthesis gas stream 4 after having been so suitably cooled, typically to a temperature of between about 180° C. and about 350° C. is then introduced into water-gas shift reactor 5 containing a water-gas shift catalyst to produce shifted stream 6. Shifted gas stream 6 is then further cooled in a series of heat exchangers 66, 68 and 70 in which the water content condenses.

Although not illustrated, heat exchangers 62, 20, 64, 66, 68 and 70 would be the conventional heaters that are found in a fired steam methane reformer to heat feed water to boiling and to help generate superheated steam used to form process steam that will be discussed hereinafter.

Shifted gas stream 6 after having passed through heat exchanger 70 is cooled to a temperature that is near ambient, typically between about 32° C. and 49° C. The water separates in a conventional knock-out drum 72 to produce a water stream 74. The dried shifted stream 75 then passes to pressure swing adsorption unit 7 that typically is capable of separating approximately 85 percent of the hydrogen to form hydrogen product stream 8 and tail gas stream 9. Tail gas stream 9 has a composition that is set forth in the example below.

Tail gas stream 9 is then heated within a heat exchanger 76 back up to the operational temperature of reactor 3, again, typically a temperature in a range of between about 482° C. and about 760° C., typically, about 677° C. and is then introduced into reactor 3. Tail gas stream 9 is successively being combusted within combustion zones 50, 48, 46, 44 and 42. As will be discussed, in order to assure adequate oxygen transport through the oxygen transport membrane elements, there has to be sufficient amount of fuel in the latter combustion zones, for instance combustion zones 44 and 42, to support the oxygen ion transfer. As a result, exhaust stream 11 contains significant amounts of unburned fuel, typically between about 1 percent and about 5 percent of the total fuel value being introduced so that combustion is between about 95 percent and about 99 percent complete.

Exhaust stream 11 then passes through an afterburner 78. Afterburner 78 can employ the same design of each of the reaction stages 22, 24, 26, 28 and 30 that will be discussed hereinafter. Each would have a separation zone, a combustion zone and a third adjacent zone which would be similar to the catalytic reaction zones without a steam methane reforming catalyst. Steam could be passed through such zones for superheating steam. Additionally, such an afterburner could be formed from any one of a number of known oxygen transport membrane units in which the fuel value of exhaust stream 10 would be combusted by separating oxygen from an oxygen containing stream to fully combust the fuel and potentially, produce additional carbon dioxide. Hence, after afterburner 78, exhaust stream principally contains carbon dioxide and water because all combustion thereof has been supported by essential pure oxygen.

The exhaust gas stream 11 then passes through heat exchangers 80, 82 and 84 in which boiler feed water is preheated in heat exchangers 80 and 82 and the oxygen containing stream is preheated within the heat exchanger 84. Further heat is then removed in heat exchangers 86 and 88 to reject heat to the ambient and to cool exhaust gas stream 11 to a temperature at which water condenses. In order to remove the condensate, exhaust gas stream is passed into a knock-out drum 90 in which the disengaged water 92 is discharged to produce a dried exhaust gas stream 94. Dried carbon dioxide stream 94 is then compressed in a compressor unit 96 that can have a series of compression stages with interstage cooling, as known in the art, to produce carbon dioxide product stream 12. Carbon dioxide product stream 12 can then be utilized in other processes, further purified or simply sequestered.

Oxygen containing stream 10 is compressed by a compressor 98 or blower to a sufficient pressure to overcome pressure drop through the plant. Typically, between about 3 and about 10 psig. Preferably, the resultant oxygen containing stream 10 is then split into streams 100 and 102. Stream 100 is heated within heat exchanger 84 to a temperature of between about 900° F. and about 1400° F. Stream 102 is heated to essentially the same temperature within heat exchanger 103.

Oxygen containing stream 100 is then subdivided into first and second subsidiary streams 104 and 106. The remainder is combined with stream 102 which is then subdivided again into third, fourth and fifth subsidiary oxygen containing streams 108, 110 and 112. The remaining portion of stream 102, namely stream 114, is then introduced into afterburner 78. As mentioned previously, oxygen is separated from stream 114 within afterburner 78.

The separation of oxygen within separation zones 52, 54, 56, 58 and 60 produce a first retentate stream 116 and separation of oxygen from stream 114 within afterburner 78 produces a second retentate stream 118. First and second retentate streams 116 and 118 are then combined to produce a combined retentate stream 120 that is introduced into a combustor 122 that is fueled, preferably with a natural gas fuel stream 124, to produce a heated stream 126. Heated stream 126 is then subdivided into subsidiary heated streams 128, 130 and 132 that are respectively passed into heat exchangers 14, 76 and 102. In heat exchanger 114, the hydrocarbon containing stream 2 is preheated, in heat exchanger 76, tail gas stream 9 is preheated and in heat exchanger 102 stream 102 is preheated. The subsidiary preheated streams 128, 130 and 132 are then recombined and with the use of a blower 134 are discharged as a stream 136.

Returning to reactor 3, the use of separate reaction stages 22, 24, 26, 28 and 30 allow for the maximum metal temperature within each of said stages to be adjusted so that at least one of the stages, for instance, the final reaction stage, namely reaction stage 30 can operate at a maximum metal temperature range of between about 900° C. and about 1100° C. Reaction stages 22, 24, 26 and 28 can operate at a lower maximum metal temperature, for example a temperature less than about 850° C. This allows for high temperature materials to be utilized in the final of the reaction stages, reaction stage 30, and lower temperature materials to be used in the upstream or preceding stages, namely reaction stages 22, 24, 26 and 28. For example, reaction stage 30 can be fabricated from an oxygen dispersed strengthened material, a relatively expensive material and reaction stages 22, 24, 26 and 28 can utilize a lower temperature material, a high temperature alloy, for instance INCONEL® 693 alloy or HAYNES 214 alloy.

In any reactor in accordance with the present invention the operation thereof is somewhat analogous to that of a fired reformer in that initially, there exists a high concentration of reactants to absorb heat in the endothermic steam methane reforming reactions. As the flow of reactants is consumed, however, there are less reactants present to react and less heat will be absorbed by reaction. Consequently in downstream locations of the reactor, for a given heat flux, temperature will naturally rise. By connecting reactor stages in series and allowing the steam methane reforming reaction to proceed from stage to stage, down stream stages will thus naturally operate at higher temperatures, assuming that the heat flux is maintained relatively constant. Provided that there are a sufficient number of reaction stages, the use of the more expensive alloys can thus be confined to downstream stages. As will be discussed, the temperature distribution can be further controlled to tailor the temperature distribution within the reactor, to ensure that the device obtains the maximum conversion of reactants within reaction stages to synthesis gas within the constraints of thermal material limitations of the material being used to form each of the reaction stages.

For example, in reactor 3, illustrated in FIG. 1, temperature can be controlled by metering oxygen containing streams 104, 106, 108, 110 and 112, so that a limited amount of oxygen is available in each of the reaction stages, and consequently the reactor temperature is thereby limited. Ideally the amount of air supplied to each of the reaction stages will be approximately equal, however there are two effects which act in opposite directions. The first effect is that the concentration of reaction products in the fuel gas/flue gas stream gradually increases through the cascade of reactors, being lowest in reaction stage 30 and highest in reaction stage 22. This has the effect of reducing the mass transfer rate of oxygen into reaction stage 22 at the same oxygen partial pressure in the oxidant stream as is present in oxidant stream 30. Consequently if the same amounts of oxidant are fed to each of the reaction stages, reaction stage 30 will tend to operate hotter than reaction stage 22. The second effect is that the partial pressure of oxidant at the inlet of each reaction stage decreases through the cascade from reaction stage 30 to reaction stage 22. This is because reaction stage 30 is the only reaction stage which is fed with undiluted oxidant. In each of the other stages, the oxidant is diluted with partially depleted oxidant even at the inlet. The relative flows of oxidant streams 104, 106, 108, 110 and 112 can be manipulated to create a desired temperature profile through the cascade of reactors, in particular it is possible to operate reaction stage 30 at a higher temperature than reaction stages 22, 24, 26 and 28. Since, as will be appreciated by those skilled in the art, each of the stages operates at conditions approaching equilibrium conversion of hydrocarbons by steam methane reforming reaction, it is possible to tailor the temperature profile on the hydrocarbon side of the reactor so that the outlet temperature of the reaction stages increases steadily as the flow progresses through reaction stages 22, 24, 26, 28 and 30. In particular to maintain a sufficiently high temperature at the exit of reaction stage 30 that the reforming reactions proceed with at least 95 percent conversion of methane to carbon monoxide and hydrogen, while maintaining a lower hydrocarbon conversion in reaction stages 22, 24, 26 and 28 with a temperature below the limits of the conventional high temperature alloys employed.

As could be appreciated by those skilled in the art, fewer of the upstream stages 22, 24, 26 and 28 could be set to operate at the lower temperature. For example, only reaction stages 22, 24 and 26 might be set to operate at the lower temperature while reaction stages 28 and 30 would operate at the higher temperature and therefore, utilize the higher temperature material. Although five reaction stages are illustrated, a greater or lesser number of such stages could be utilized.

Figure 2:
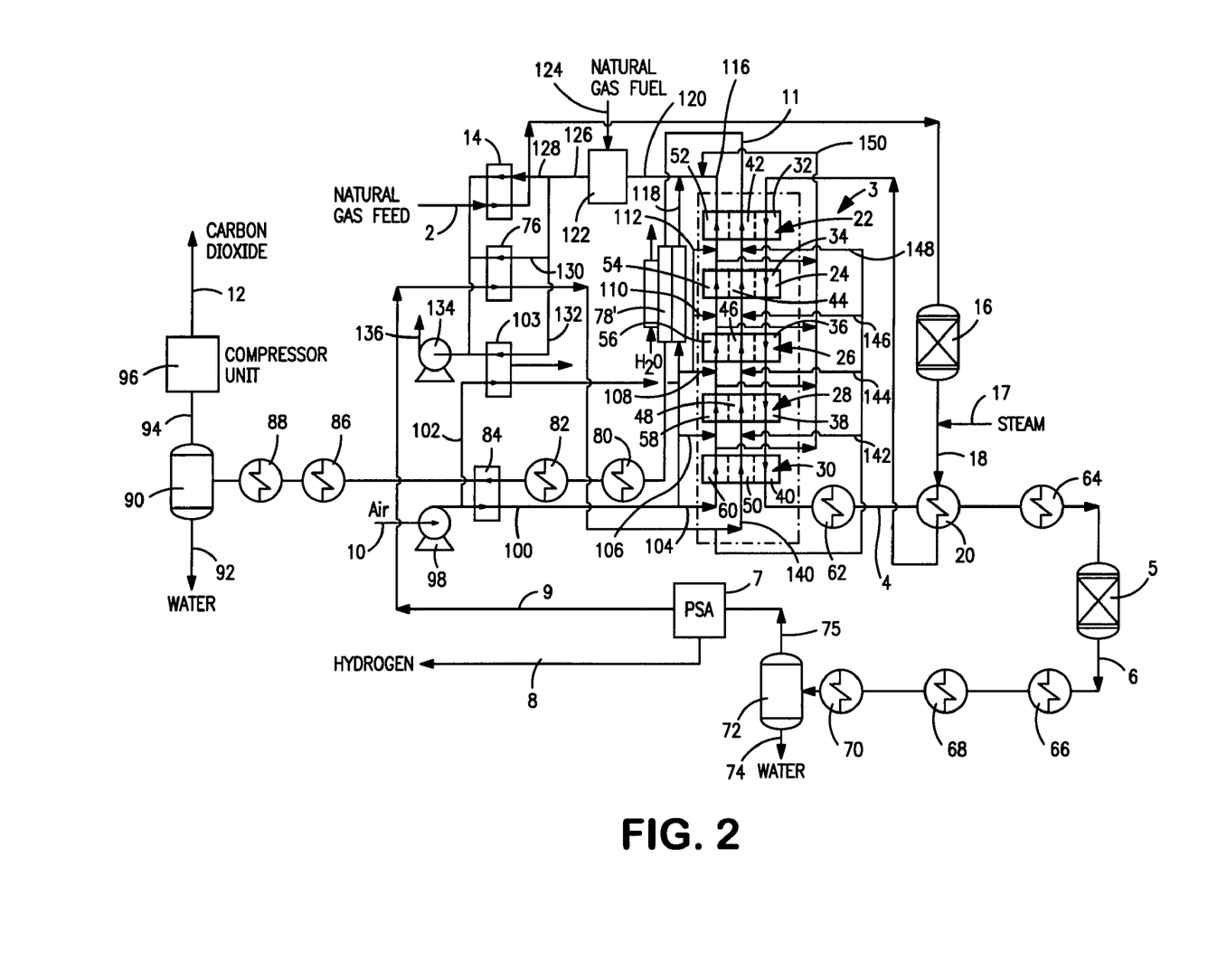
FIG. 2 is an alternative embodiment of FIG. 1.

With reference to FIG. 2, a different technique is utilized to fine tune the control of temperature within the reaction stages. In FIG. 2, the amount of fuel that is introduced into each of the reaction stages 22, 24, 26, 28 and 30 is metered. In this embodiment, tail gas stream 9 is subdivided into fuel streams 140, 142, 144, 146 and 148. The temperature attained in each reaction stage is again limited by mass transfer of oxidant and by the inlet temperature of reactants from the upstream reaction stage. Accordingly, if the amounts of fuel supplied to each stage are equal, reaction stage 30 will naturally tend to operate hotter than the upstream stages. The precise temperatures at which each of the stages will operate can be adjusted to some extent by controlling the fuel supplied to each stage through streams 140, 142, 144, 146 and 148. However it should be noted that the process side temperature will in all cases tend to increase as the flow proceeds through the stages, being as always limited by equilibrium considerations. As can be appreciated, the combination of the methods for fine tuning the control of temperature could be utilized in that subsidiary oxygen containing streams 116, 108, 110 and 112 could be metered as well as subsidiary fuel streams 140, 142, 144, 146 and 148. Metering of these streams can simply be a matter of appropriately sizing the pipe diameters for such streams or can be more sophisticated with the use of manually operated or automatically operated control valves that utilize a control system and temperature sensors to constantly compute the flow rates and to adjust the flow rates entering reactor stages 22, 24, 26, 28 and 30.

Figure 3:
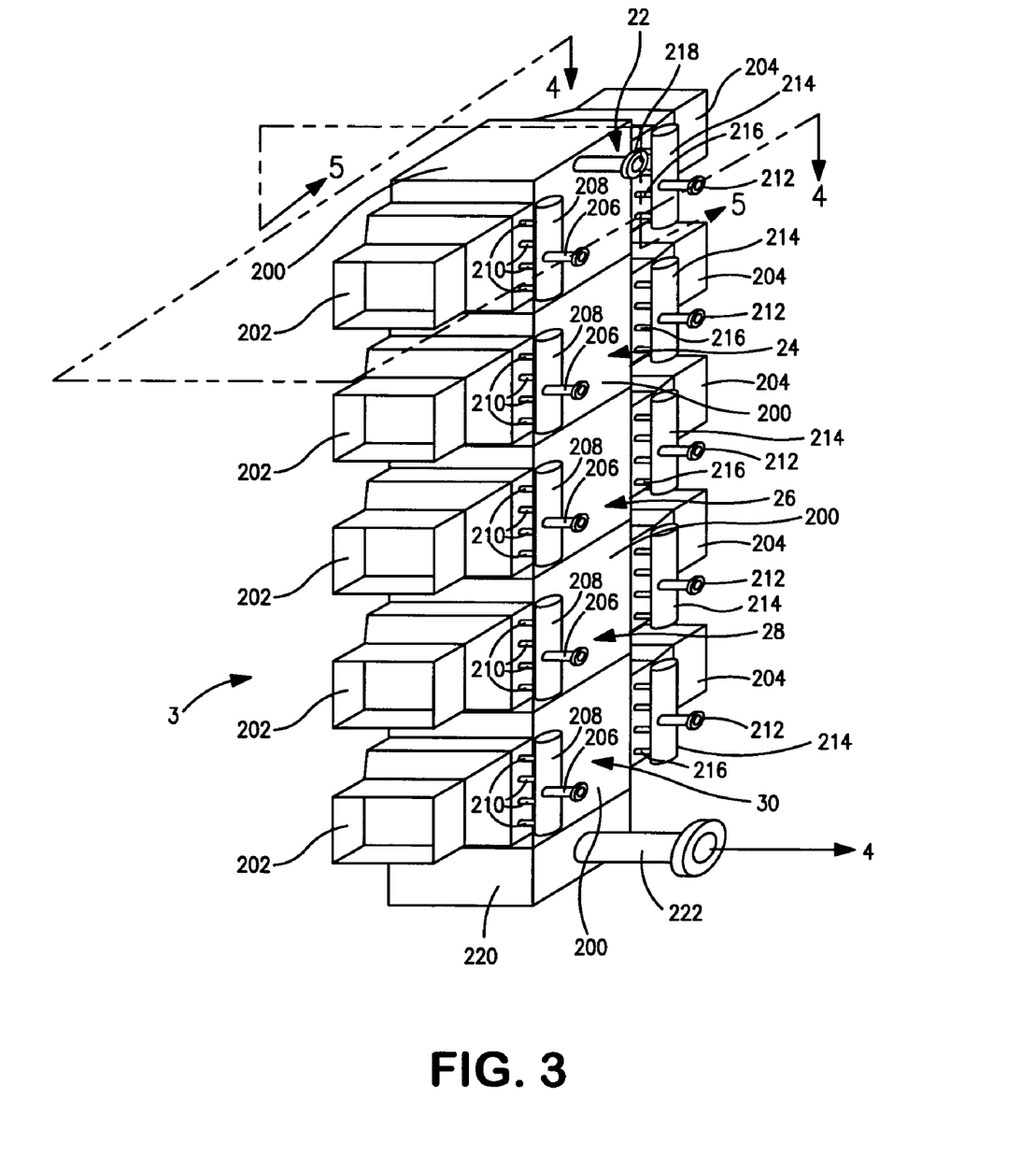
FIG. 3 is a perspective view of a reactor in accordance with the present invention.

With reference to FIG. 3, reactor 3 is illustrated. Reactor 3 is provided with reaction stages 22, 24, 26, 28 and 30. Each of the reaction stages 22, 24, 26, 28 and 30 is provided with a housing 200 having an oxygen containing gas inlet 202 and a retentate outlet 204. In order to utilize reactor 3 in the embodiment illustrated in FIG. 1, oxygen containing gas inlet 202 of reaction stage 30 would be connected to a conduit to receive the subsidiary oxygen containing gas stream 104. Retentate outlet 204 would be connected to oxygen containing gas inlet 202 of reaction stage 28. In addition, a conduit could also be connected to oxygen containing gas inlet 202 of reaction stage 28 to receive subsidiary oxygen containing stream 106. Similarly, retentate outlet 204 of reaction stage 28 would be connected to oxygen containing gas inlet 202 of reaction stage 26. Additionally, a conduit could be connected to oxygen containing gas inlet 202 of reaction stage 26 to receive subsidiary oxygen containing gas stream 108. Retentate outlet 204 of reaction stage 26 would be connected to oxygen containing gas inlet 202 of reaction stage 202. Additionally, the conduit would be connected to oxygen containing gas inlet 202 of reaction stage 24 for subsidiary oxygen containing gas stream 110. Retentate outlet 204 of reaction stage 24 would be connected to oxygen containing gas inlet 202 of reaction stage 22. A separate conduit would be provided for introduction of subsidiary oxygen containing gas stream 112 into oxygen containing gas stream 202. First retentate stream 116 is discharged from retentate outlet 204 of reaction stage 22. The aforementioned conduits would act as intermediate oxygen containing gas inlets to allow for the oxygen containing gas to be separately metered to each of the aforesaid reaction stages. If reactor 3 were to be used in the embodiment of FIG. 2, then such conduits would not be included and the oxygen containing gas inlets 202 of the reaction stages 22, 23, 26 and 28 would be connected solely to conduits to receive subsidiary oxygen containing streams 112, 110, 108 and 106, respectively.

Each of the reaction stages 22, 24, 26, 28 and 30 is provided with a fuel gas inlet 206, a fuel manifold 208 and fuel distributor pipes 210. Furthermore, each of the reaction stages is provided with an exhaust gas outlet 212. Each exhaust gas outlet 212 is connected to an exhaust gas manifold 214 to receive exhaust gases from the reaction stages and exhaust pipes 216.

Fuel gas inlet 206 of reaction stage 30 is connected to a conduit to receive tail gas stream 9. In the embodiment illustrated in FIG. 1, exhaust gas outlet 212 is connected to fuel gas inlet 206 of reaction stage 28; exhaust gas outlet 212 of reaction stage 28 is connected to fuel gas inlet 206 of reaction stage 26; fuel gas outlet 212 of reaction stage 26 is connected to fuel gas inlet 206 of reaction stage 24; exhaust gas outlet 212 of reaction stage 24 is connected to fuel gas inlet 206 of reaction stage 22. Exhaust gas outlet 212 discharges exhaust stream 11. In the embodiment of FIG. 2, separate conduits would be connected to: fuel gas inlet 206 of reaction stage 28; fuel gas inlet 206 of reaction stage 26; fuel gas inlet 206 of reaction stage 24; and fuel gas inlet 206 of reaction stage 22. This would allow the separation metering and introduction of fuel streams 142, 144, 146 and 148 and as such, the conduits would serve as intermediate fuel inlets for reactor 3.

Reaction stage 22 is provided with a reaction gas inlet 218 to receive reaction gas stream 18 and a gas collection box 220 is connected to the underside of the housing 200 which is open of reaction stage 30 to discharge synthesis gas stream 4 from a synthesis gas outlet 222. As will be discussed, each of the reactor stages 22, 24, 26, 28 and 30 are connected in series so that intermediate synthesis gas products produced by reaction stage 22 are fed to reaction stage 24; and from reaction stage 24 to reaction stage 26; then from reaction stage 26 to reaction stage 28; and from reaction stage 28 to reaction stage 30.

Figure 4:
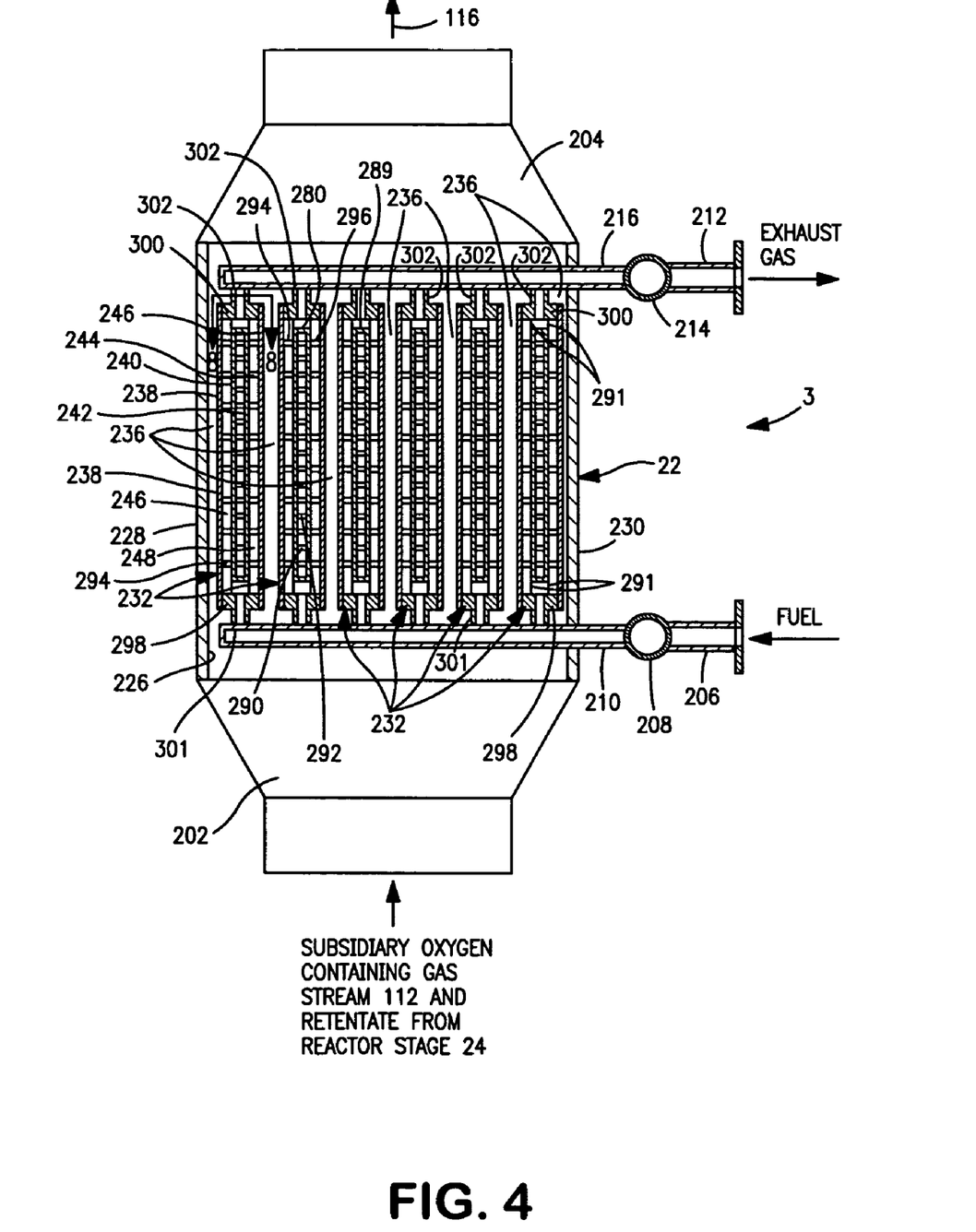
FIG. 4 is a cross-sectional view of FIG. 3 taken along line 4-4 thereof illustrating reactor elements of the present invention.
Figure 5:
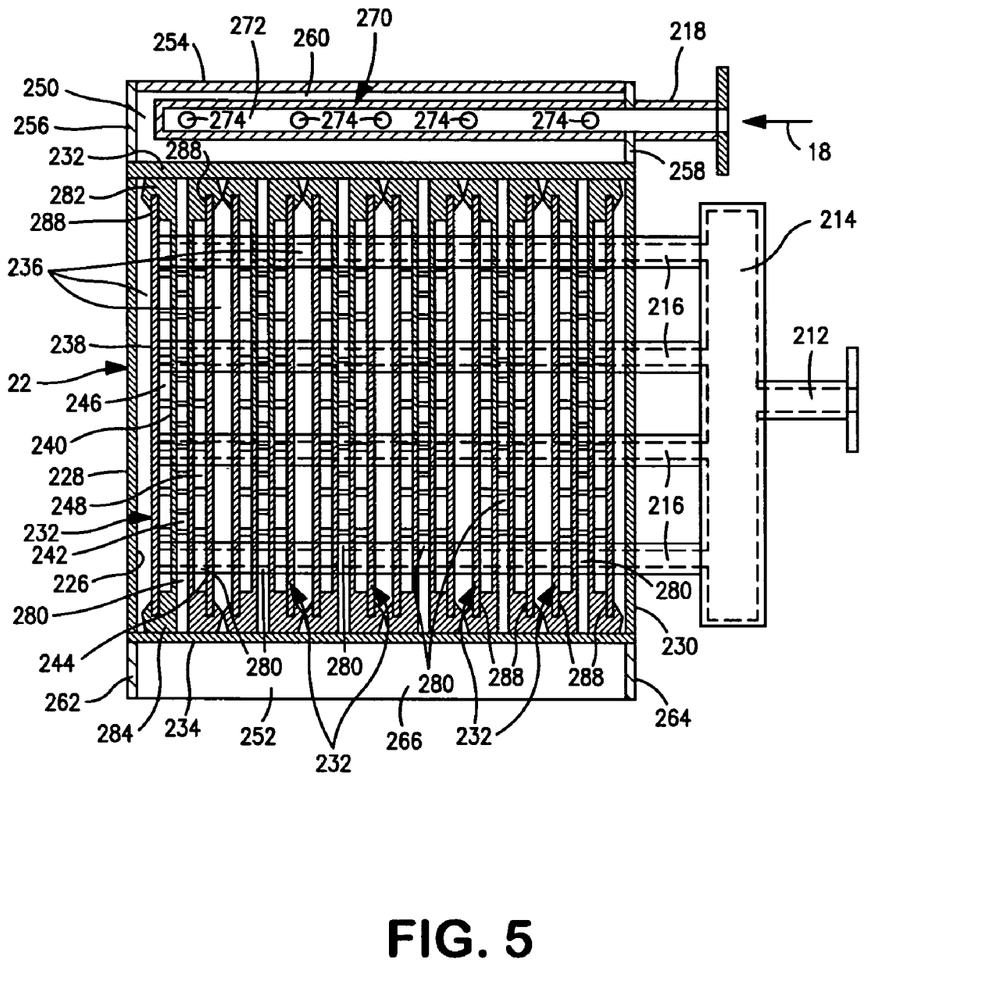
FIG. 5 is a cross-sectional view of FIG. 3 taken along line 5-5 of FIG. 3 further illustrating reactor elements of the present invention.

With reference to FIGS. 4 and 5, each of the housings 200 form a chamber 226 that is defined between side walls 228 and 230 and top and bottom walls 232 and 234. Housed within chamber 226 are 6 identical reactor elements 232. Chamber 226 is open and provided with end walls to permit the oxygen containing gas streams 104, 106, 108, 110 and 112 to be introduced into oxygen containing gas inlet 202 and retentate to be discharged from retentate outlets 204. In case of reaction stage 22, the oxygen containing gas would be combined and would consist of subsidiary oxygen containing gas stream 112 and retentate emanating from reactor stage 24 and from its respective retentate outlet 204. In case of reactor stage 22, first retentate stream 116 is discharged from its retentate outlet 204 as a first retentate stream 116.

As mentioned previously, the oxygen containing gas enters separation zones within chamber 226 for purposes of separating oxygen from the oxygen containing gas. With respect to reactor element 232, such separation zones are the open spaces within chamber 226 defined by reactor elements 232, for example separation zones 236 that collectively form the separation zones 52 referenced in FIGS. 1 and 2.

Each of the reactor elements 232 are formed from first, second, third and fourth parallel plates 238, 240, 242 and 244. Combustion zones 246 and 248 are located between first and second parallel plates 238 and 240; and third and fourth parallel plates 242 and 244. The fuel entering inlet pipes 210 for reactor stage 22 are distributed to combustion zones 246 and 248 and the exhaust gas is collected by outlet pipes 216 and outlet manifold 214 to be discharged through exhaust gas outlet 212. The combustion zones 246 and 248 of reactor elements 232 collectively form the combustion zone 40 discussed above with respect to reaction stage 22. Reaction stages 24, 26, 28 and 30 are constructed in the same manner.

Reactant gas enters a top plenum 250 and is discharged from a bottom plenum 252. Top plenum with respect to reaction stage 22 has a top wall 254 and opposed side walls 256 and 258; and side walls 260. Bottom plenum has opposed side walls 262 and 264 and opposed side walls 266. Reaction gas stream passes into top plenum 250 and partially reacted gases or intermediate gases are discharged from bottom plenum 252 to the next subsequent stage which would be reaction stage 24.

Figure 6:
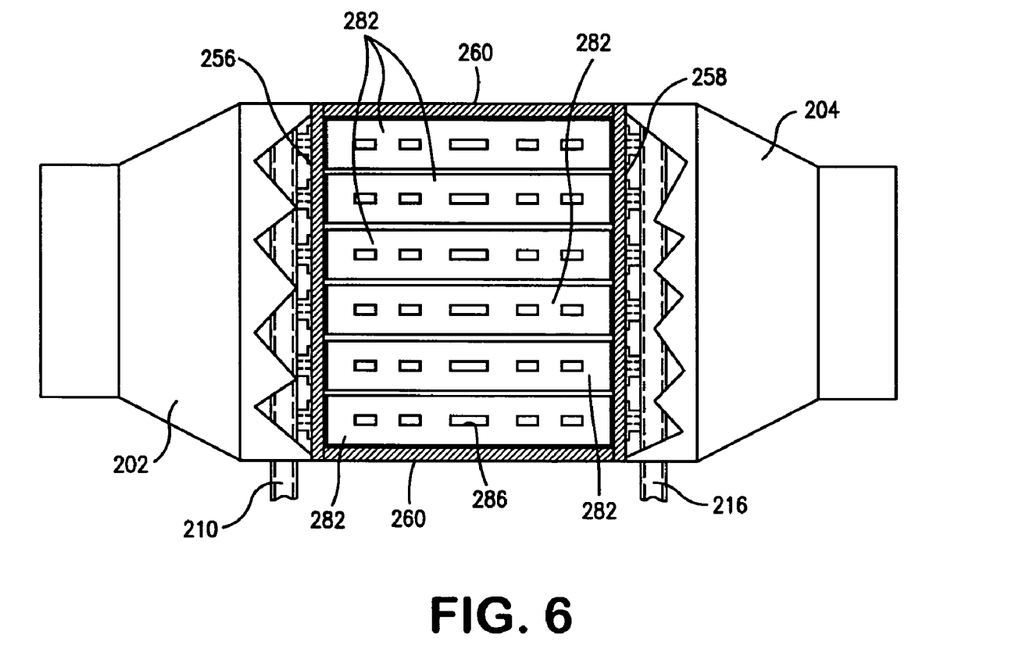
FIG. 6 is a top plan view of a reactor stage in accordance with the present invention with portions broken away to illustrate a top plan view of reactor elements of the present invention.
Figure 7:
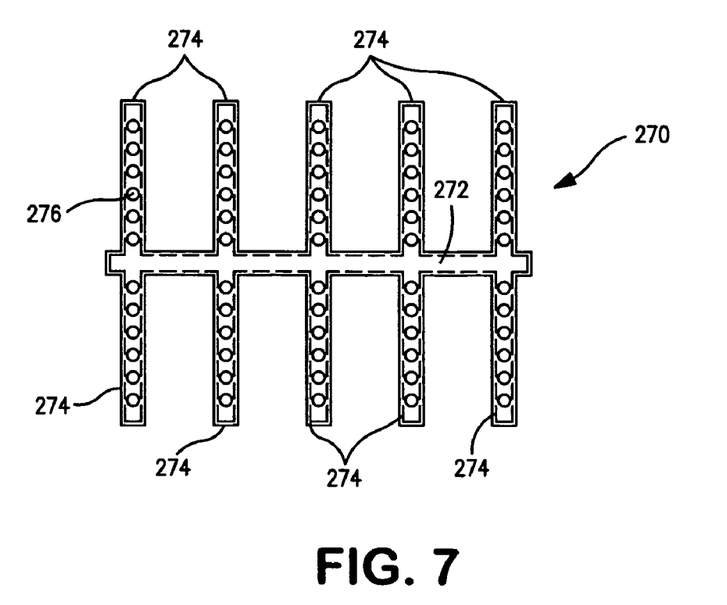
FIG. 7 is a fragmentary, plan view of a distributor that is utilized in distributing reactant to the reaction stages.

With additional reference to FIGS. 6 and 7, reactant stream 18 enters reactant inlet 218. Reactant inlet 218 is connected to a fluid distributor 270 having a central conduit 272 connected to reactant inlet 218 and distribution branches 274 having openings 276 to distribute the reactant of steam and hydrocarbons and the catalytic reaction zones 280 that will be discussed. Catalytic reaction zones 280 form the catalytic reaction zones 32, 34, 36, 38 and 40 that have been previously discussed. These zones are connected in series such that plenum 252 would be connected to plenum 250 of the next succeeding reaction stage 24. Plenum 250 of reaction stage 24 would of course not be provided with top wall 254 for such purposes. Reaction stage 30 again would be open at top plenum 250 and be closed at bottom plenum 252 thereof with provision of synthesis gas outlet 222 connected to a fluid distributor having the same configuration as fluid distributor 270.

The planar members 238, 240, 242 and 244 are retained within a frame. This frame allows movement of all planar members to prevent stresses from building up and causing warpage of the planar members. In this regard, planar members 240 and 242 are connected at the top and bottom edges to opposed transverse members 282 and 284, at the top and bottom thereof. Planar members 282 are welded together as are planar members 284 to hold the reactor elements in place. With reference again to FIG. 6, transverse members 282 are provided with slot-like openings 286 to enable the reactant to enter reaction zones 280. Similarly, although not illustrated, transverse members 284 would also be provided with such slot-like openings to discharge the intermediate product.

Additionally, the transverse edges of planar members 238 and 244 are retained within grooves 288 of transverse members 282 and 284 to enable them to expand and contract.

With specific reference to FIG. 4, planar members 240 and 242 are in turn connected by end walls 289 and as such, reaction zones 280 are defined by a rectangular-like tube formed between end walls 289 and planar members 240 and 242. Four sets of tabs 291, extending from edge portions of planar members 240 and 242, equally spaced and located between two nozzle-like projections 301 and 302 are provided to center the reaction zone 280 with respect to the combustion zones 246 and 248.

Integrally formed with planar members 240 and 242 are pillar-like projections 290 and 292 for structural support. Pillar-like projections 290 are integrally formed with planar member 240 and pillar-like projections 292 are integrally formed with planar members 244. Similarly, pillar-like projections 294 are integrally formed with planar member 238 and pillar-like projections 296 are integrally formed with planar member 244. The aforesaid pillar-like projections are not, however, connected to the opposite planar member from which they are formed to allow for thermal expansion. For example, pillar-like projection 294 extend from planar member 238 but are not connected to planar member 240.

Figure 8:
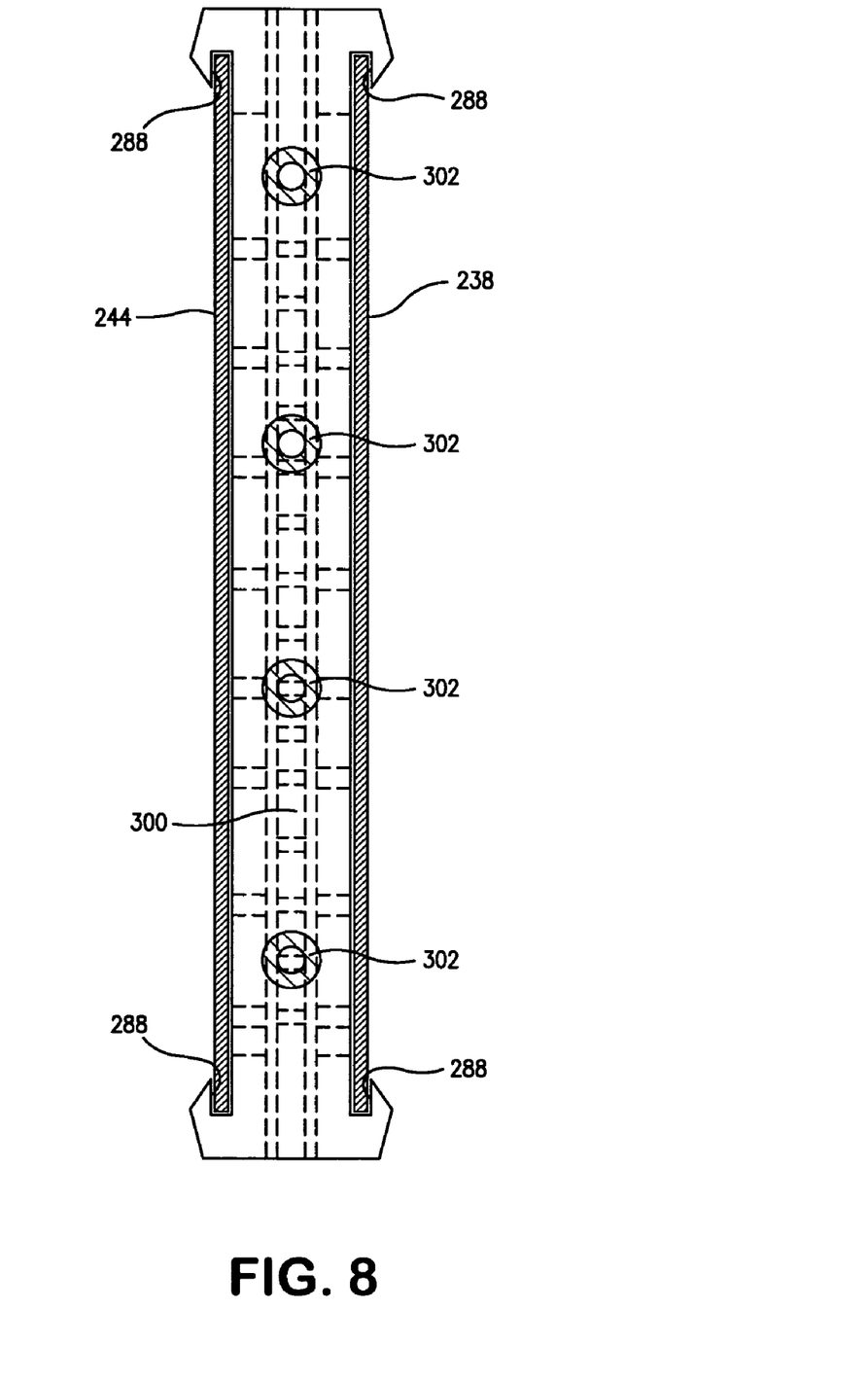
FIG. 8 is a fragmentary cross-sectional view of FIG. 4 taken along line 8-8 thereof.

With additional reference to FIG. 8, planar members 238 and 244 are connected to headers 298 and 300 having nozzle-like projections 301 and 302. Nozzle-like projections 301 connect to inlet pipes 210 to receive the fuel gas and nozzle-like projections 302 connect to exhaust pipe 216 to discharge the combustion products. Each of the reactor elements 232 is provided with four of such projecting nozzle elements 301 and 302 to connect to four fuel inlet pipes 210 and four exhaust pipes 216, respectively.

Figure 9:
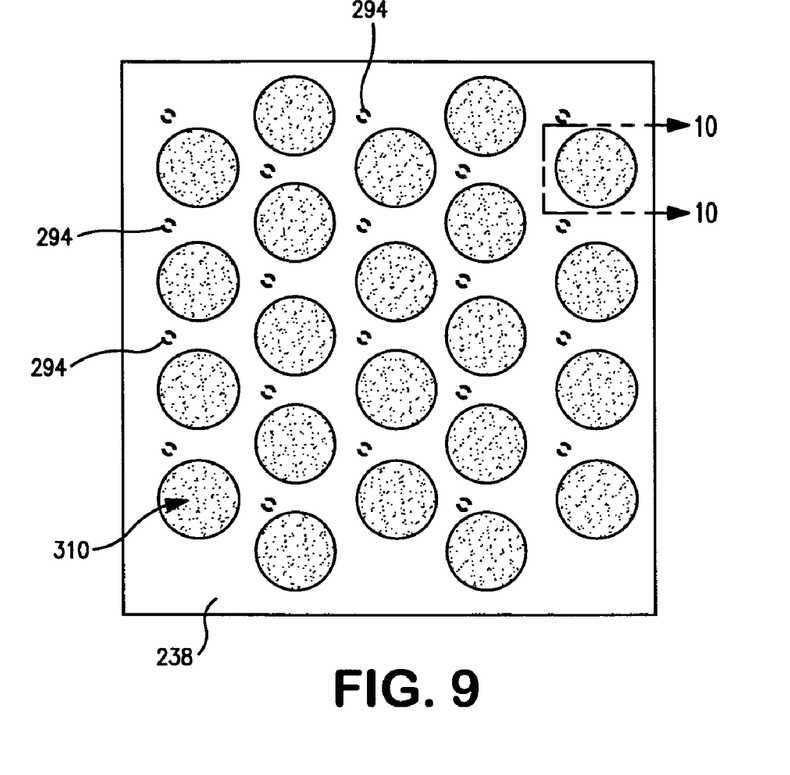
FIG. 9 is a plan view of an oxygen transport membrane element of the present invention.
Figure 10:
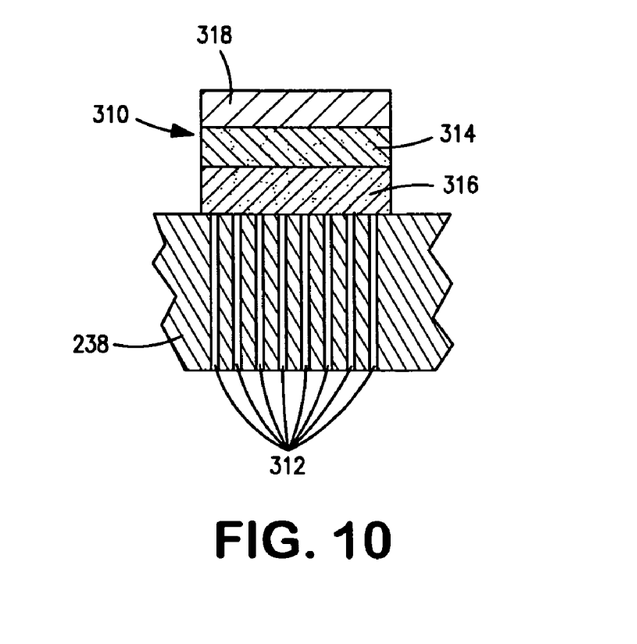
FIG. 10 is a fragmentary schematic, sectional view of an oxygen transport membrane element of the present invention taken along line 10-10 of FIG. 9.

With reference to FIGS. 9 and 10, each of the planar members 238 and 244 serve as oxygen ion transport elements to separate oxygen from the incoming oxygen containing gas. Illustratively planar member 238 is illustrated and will be discussed herein. It is understood that planar member 244 is identical. Planar member 238 on its exterior surface is provided with oxygen ion membrane materials 310. They are circular in configuration and overlie and are in registry with perforated areas of planar member 238 provided by perforations 312.

As discussed above, the control of temperature allows planar members 238 through 244 of reaction stage 30 to be made of the more expensive high temperature materials, for instance, oxide dispersed strengthened metal as opposed to the upstream reaction stages 22, 24, 26 and 28 which can all be made out of a less expensive, high temperature alloy. Oxide-dispersed strengthened metal alloys reliably function while maintaining their structural integrity by being resistant to creep and out and out failure at high temperatures of up to 1200° C. Such metal alloys contain aluminum, chromium, and iron and yttrium oxide and can be obtained as MA956 alloy from Special Metals Corporation, Huntington, W. Va., United States or PM2000 alloy from Plancee Holding AG, an Austrian corporation having a place of business at A-6600 Reutte/Tirol Austria. Other possible materials are metal-reinforced intermetallic alloys, for example, Nb-reinforced $Nb_3Al$ ($Nb/Nb_3Al$), Nb or TiNb/TiAl, Mo or Cr/NiAl, $Nb/MoSi_2$, Boron-doped $Mo_5Si_3$-based intermetallic alloys and combinations thereof. Ceramic materials include, yttria toughened zirconia (such as Y-TZP, $ZrO_2$-3% $Y_2O_3$), ceria toughened zirconia (such as Ce-TZP, $ZrO_2$-$xCeO_2$), or gadolinium doped ceria. All of the alloys and ceramics have attractive high temperature properties including good creep resistance and superior mechanical strength. These materials also have high fracture toughness.

The proceeding reaction stages 22, 24, 26 and 28 can be fabricated from less expensive high temperature alloys, discussed above. It is to be noted that the walls of the reactor stages formed by housing 200 of any reactor stage need not in any case be constructed of high temperature materials in that they are exposed to the ambient temperature and heat will thereby dissipate into the ambient environment.

With specific reference to FIG. 10, each of the circular regions of the oxygen ion membrane materials 10 has a dense layer 314 applied to a porous layer 316 that is in turn applied to planar member 228. Pores 312 are of cylindrical or slightly conical configuration and can be formed by known electron beam drilling techniques. Such pores can taper from about 150 microns to about 75 microns. Porous layer 316, located between dense layer 314, and planar member 238 helps to at least distribute separated oxygen from dense layer 314 to the cylindrical pores 312. For such purposes the pores of porous layer 316 are interconnected. Both dense layer 314 and porous layer 316 can be composed of a material capable of conducting both oxygen ions and electrons such as will be discussed below.

Dense layer 314 is preferably a mixture of three phases containing a mixed conductor, an ionic conductor and a metallic electronic conductor can contain about 40 percent by weight "LSFT" ($La_{0.2}Sr_{0.8}Fe_{0.6}Ti_{0.4}O_3$), 40 percent by weight "CGO" ($Ce_{0.8}Gd_{0.2}O$), and about 20 percent by weight silver. Porous layer 316 can be similarly formed. The difference between the coefficient of thermal expansion of such material over a MA956 oxide dispersed strengthened metal is less than 1 ppm/° K. over the range of about 100° C. to about 1000° C. The proportions would be adjusted for upstream stages formed of high temperature alloys in a manner known in the art.

The material for the dense layer 314 and the porous layer 316 can be prepared by first obtaining about 40 grams of LSFT powder having particle sizes of between about 20 and about 30 microns agglomerated from primary particle sizes of between about 0.3 microns and about 0.5 microns, 40 grams of CGO powder having particle sizes of between about 20 and about 30 microns agglomerated from primary particle sizes of between about 0.5 and about 0.6 microns, and 20 grams of silver powder with particle size of between about 2 and about 3 microns. The foregoing components can be placed into a plastic vial with a few mixing zirconia balls. The powder mixture can then be ball milled for 20 minutes.

Dense layer 314 and a porous layer 316 can be applied to the porous regions of planar member 238 by plasma spraying with standard deposition conditions. Porous layer 316 can have a thickness of about 80 microns. The porosity within the porous layer 316 can be achieved using the above three-component mixed powder blended with 40 percent by weight of graphite having average particles size of 75 microns. The dense layer 314 can then be applied to porous layer 316. The thickness of dense layer 314 is preferably about 150 microns.

In order to prevent silver evaporation at high temperature, an additional thin porous layer 318 with thickness less than 20 microns of LSFT coating containing no silver addition can be plasma sprayed on the surface of dense layer 314. This porous LSFT coating can be obtained by spraying the above LSFT powder mixed with 40 percent weight graphite having average particle size of 75 microns.

It is to be noted that a reactor 3 could incorporate oxygen transport membrane elements that would utilize a single dense layer on a planar porous support as opposed to the structure outlined above having an underlying porous layer 314 with interconnected pores and an overlying layer 316 to prevent silver evaporation. As could be appreciated, an oxygen transport membrane element having such structure would not incorporate the efficiency and potential longevity of the structure specifically described herein.

As could be appreciated by those skilled in the art, the oxygen transport membrane element described above has broader applicability than its use in a reactor and could be used in any oxygen separation device or any oxygen transport membrane reactor.

A further point worth mentioning is that although the foregoing reaction stages 22, 24, 26, 28 and 30 are preferred other types of reactors could be employed in the present invention that would advantageously operate at successively higher temperatures to minimize the use of expensive materials. In this regard, the prior art has provided examples of three passage oxygen transport membrane reactors having separation zones, combustion zones and reaction zones that are capable of conducting steam methane reforming reactions. Such reactors can incorporate tubular oxygen transport membrane elements and are in any case different from the individual reaction stages incorporated into reactor 3 described in detail hereinabove. As could be appreciated by those skilled in the art, such reactors could be linked together in a manner in which each reactor would function as a reaction stage in a manner that would enable a process of the present invention to be conducted.

As indicated above, the preferred reaction stage design employed with respect to reaction stages 22, 24, 26, 28 and 30 could form the structure of a single reactor. Such a reactor could be used to conduct any endothermic catalyzed reaction.

Furthermore, even in the illustrated embodiment, it is possible to construct a reactor element having only three planar members, namely a planar member to serve as an oxygen ion transport element and the two adjacent members to perform a reaction zone and a combustion zone.

The following is a calculated example of a reactor 3 utilized within the environment of FIG. 1. This worked example is for production of 100 million standard cubic feet of hydrogen per day, using a steam to carbon ratio of 2.75. For purposes of this example, 120 reactor modules, each consisting of 25 reactor elements 232 were employed in total. Each such module has overall dimensions 1 m by 1 m by 1 m and contains 50 m2 of heat transfer surface and 29 m$^2$ of active OTM surface. The total area available for oxygen transport within the device is 3480 m$^2$ and the system operates with a total oxygen flux of about 1.20 lbmol/h/m$^2$ (approximately 20 sccm/cm$^2$). The following tables summarize the results:

| | Reactant and Synthesis Gas Product Properties | | | | | |
|---|---|---|---|---|---|---|
| | Natural Gas Feed plus steam Stream 18 | Synthesis Gas Product Stream 14 | Tail Gas Stream 9 | Exhaust Stream 11 | Combined Oxidant Stream* | Retentate Stream 116 |
| H2, lbmol/h | 207.6 | 10949.3 | 1497.2 | 0 | 0 | 0 |
| H2O, lbmol/h | 11417.4 | 6964.7 | 88.7 | 3272.8 | 0 | 0 |
| CO, lbmol/h | 0 | 2145.6 | 618.3 | 0 | 0 | 0 |
| CO2, lbmol/h | 73.4 | 1227.3 | 2754.6 | 4214.8 | 0 | 0 |
| METHANE, lbmol/h | 3794.9 | 852.8 | 841.8 | 0 | 0 | 0 |
| ETHANE, lbmol/h | 54.1 | 0 | 0 | 0 | 0 | 0 |
| N2, lbmol/h | 62.5 | 62.5 | 62.5 | 62.5 | 13034.4 | 13034.4 |
| O2, lbmol/h | 0 | 0 | 0 | 66.1 | 3464.84 | 346.5 |
| C2H4, lbmol/h | 0 | 0 | 0 | 0 | 0 | 0 |
| C3H8, lbmol/h | 15.8 | 0 | 0 | 0 | 0 | 0 |
| C4H10, lbmol/h | 5.4 | 0 | 0 | 0 | 0 | 0 |
| C5H12, lbmol/h | 0 | 0 | 0 | 0 | 0 | 0 |
| C6H14, lbmol/h | 0 | 0 | 0 | 0 | 0 | 0 |
| C7H16, lbmol/h | 0 | 0 | 0 | 0 | 0 | 0 |

-continued

Reactant and Synthesis Gas Product Properties

| | Natural Gas Feed plus steam Stream 18 | Synthesis Gas Product Stream 14 | Tail Gas Stream 9 | Exhaust Stream 11 | Combined Oxidant Stream* | Retentate Stream 116 |
|---|---|---|---|---|---|---|
| C8H18, lbmol/h | 0 | 0 | 0 | 0 | 0 | 0 |
| CARBON, lbmol/h | 0 | 0 | 0 | 0 | 0 | 0 |
| Temperature, deg F. | 868 | 1609 | 116 | 342 | | |
| Pressure, psia | 400 | 340 | 20 | 16 | | |
| Flowrate, lbmol/h | 15811.4 | 22202.2 | 5863.1 | 7616.2 | | |

*Total of streams 104, 106, 108, 110, 112

While the present invention has been described with reference to a preferred embodiment, as will occur to those skilled in the art, other changes, additions and omissions may be made without departing from the spirit and scope of the present invention as set forth in the appended claims.

We claim:

1. A method of producing a synthesis gas product stream containing hydrogen and carbon monoxide comprising:

reacting at least one hydrocarbon with the steam in steam methane reforming reactions conducted within separate reaction stages to produce the synthesis gas product stream;

the reaction stages containing catalytic reaction zones within which the steam methane reforming reactions are conducted, combustion zones located adjacent to the reaction zones, separation zones located adjacent to the combustion zones and oxygen transport membrane elements located between the separation zones and the combustion zones;

combusting a fuel within the combustion zones so that heat is provided to support endothermic heating requirements of the steam methane reforming reactions and operational temperature requirements of the oxygen transport membrane elements;

introducing an oxygen containing gas into the separation zones and separating oxygen from the oxygen containing gas by oxygen ion transport occurring within the oxygen transport membrane elements, thereby to provide oxygen to support combustion of the fuel within the combustion zones;

passing intermediate product streams produced through the steam methane reforming reactions sequentially through the reaction stages and discharging the synthesis gas product stream from a final of the reaction stages; and controlling temperature within each of the reaction stages by providing a sufficient number of the reaction stages such that at least the final of the reaction stages operates at a temperature range of between about 900° C. and about 1100° C. and at least one of the reaction stages, located upstream of the at least final reaction stage, has an operational temperature less than said temperature range due to the consumption of the heat in the endothermic reactions occurring within the at least one of the reaction stages.

2. The method of claim 1, wherein temperature is further controlled within each of the reaction stages by at least one of separately metering fuel streams containing the fuel into the combustion zones of each of the reaction stages and separately metering oxygen containing streams containing the oxygen containing gas into the separation zones of each of the reaction stages.

3. The method of claim 1 or claim 2, wherein:

the combustion zones are connected in series so that an exhaust stream comprising carbon dioxide, water and unburned fuel is discharged from a last of the combustion zones directly adjacent and opposite to the final of the reaction zones;

the exhaust stream is introduced into an oxygen transport membrane combustor to combust the unburned fuel and thereby to produce a carbon dioxide and water containing stream containing additional carbon dioxide and additional water from the combustion of the unburned fuel;

the carbon dioxide and water containing stream is cooled to condense the water and the water is separated from the carbon dioxide and water containing stream to produce a carbon dioxide-rich stream; and carbon dioxide is separated from the carbon dioxide-rich stream to produce a carbon dioxide product stream.

4. The method of claim 3, wherein:

the synthesis gas stream is cooled to condense a water content of the synthesis gas stream;

the water content is removed from the synthesis gas stream after having been cooled;

hydrogen is separated from the synthesis gas stream after the water content has been removed to produce a hydrogen product stream and a tail gas stream; and the tail gas stream is utilized as the fuel.

5. The method of claim 4, further comprising subjecting the synthesis gas stream to a water-gas shift reaction to increase the hydrogen content thereof after having been partly cooled.

6. The method of claim 4, wherein:

the oxygen containing gas after having passed through the separation zones is collected to form a first retentate stream;

a subsidiary oxygen containing stream is introduced into the oxygen transport membrane combustor to form a second retentate stream;

the first and second retentate streams are introduced into a combustor to generate a heated stream; and the heated stream is subdivided to produce subsidiary heated stream that indirectly transfers heat to the reactant stream, the tail gas stream and part of the oxygen containing stream.

7. A reactor for conducting a steam methane reforming reaction, said reactor comprising:

a plurality of separate reaction stages to conduct steam methane reforming reactions and thereby to produce the synthesis gas product stream;

the reaction stages containing reactor elements defining catalytic reaction zones within which the steam methane reforming reactions are conducted, combustion zones located adjacent to the reaction zones for combusting a fuel, separation zones located adjacent to the combustion zones for passage of an oxygen containing gas and oxygen transport membrane elements located between the separation zones and the combustion zones for separating oxygen from the oxygen containing gas, thereby supplying the oxygen to the combustion zones to support combustion of the fuel;

the combustion of the fuel supplying heat to support endothermic heating requirements of the steam methane reforming reactions being conducted within the reaction zones and to maintain the oxygen transport membrane materials at an operational temperature;

the reaction stages connected in series so that intermediate product streams produced through the steam methane reforming reactions sequentially passes through the reaction stages and the synthesis gas product stream is discharged from a final of the reaction stages; and the reactor elements employed in at least the final of the reaction stages fabricated from a higher temperature material capable of maintaining structural integrity within a temperature range of between about 900° C. and about 1100° C. and the reactor elements employed in at least one of the reaction stages, located upstream of the at least final reaction stage, fabricated from a lower temperature material capable of maintaining structural integrity below the temperature range, but not within the temperature range.

8. The reactor of claim 7, further comprising at least one of intermediate fuel inlets and intermediate oxygen containing gas inlets located between the reaction stages for separately metering fuel flow rate of the fuel introduced into the combustion zones of each of the reaction stages and for separately metering gas flow rate of the oxygen containing gas introduced into the separation zones of each of the reaction stages, respectively, for controlling temperature in each of the reaction stages.

9. The reactor of claim 7 or claim 8, wherein the higher temperature material is oxide dispersed strengthened metal and the lower temperature material is a high temperature alloy.

10. The reactor of claim 7, wherein:

each of the reaction stages includes a housing having a chamber, an oxygen containing gas inlet, a retentate outlet, a fuel gas inlet, an exhaust, a reactant inlet, a reactant outlet and at least one of the reactor elements located within the chamber containing at least one of the reaction zones and at least one of the combustion zones;

the at least one of the reactor elements formed of at least three spaced parallel, planar members to form the at least one of the combustion zones between a first planar member and a second planar member of the at least three planar members and communicating between the fuel gas inlet and the exhaust, at least one of the reaction zones between the second planar member and a third planar member of the three planar members and communicating between the reactant inlet and the reactant outlet and a set of supports separating the three planar members;

at least one of the separation zones is defined by part of the chamber and separated from the at least one combustion zone by the first planar member; and the first planar member having spaced arrays of openings and regions of oxygen transport membrane material located on said at least one planar member in registry with said openings and within the at least one of the separation zones, thereby to form one of the oxygen transport membrane elements.

11. The reactor of claim 10, further comprising:

a fourth planar member located adjacent to and spaced from the third planar member so that two of the combustion zones are located between the first and the second of the planar members and between the third planar member and the fourth planar member;

the fourth planar member having the same configuration as the first planar member and with further regions of oxygen transport membrane material located on the fourth planar member and in registry with the arrays of openings defined in the fourth planar member, thereby to form two oxygen transport membrane elements by said first of the planar members and the fourth planar member; and two of the separation zones formed within the chamber are separated from the two combustion zones by the first planar member and the fourth planar member.

12. The reactor of claim 11, wherein:

the first planar member, the second planar member, the third planar member and the fourth planar member are retained within a rectangular frame;

the second planar member and the third planar member are connected at a first set of opposed edges thereof to a pair of opposed transverse members of said rectangular frame and sealed along a first set of lengthwise edges to form a tube of rectangular cross-section, the pair of opposed transverse members having openings in communication with the reactant gas inlet and reactant gas outlet;

the first planar member and the fourth planar member are retained along a second set of opposed edges within slots of the opposed transverse member and sealed along lengthwise edges by elongated headers having openings in communication with the fuel gas inlet and the fule gas outlet; and the supports constitute pillar-like projections integrally formed with the first planar member, the second planar member, the third planar member and the fourth planar member.

13. The reactor of claim 12, wherein:

the four spaced parallel, planar members and the pillar-like projections thereof within the at least the final of the reaction stages is formed from the higher temperature material and said higher temperature material is an oxide dispersed strengthened metal; and the four spaced parallel, planar members within the at least one of the reaction stages and the pillar-like projections thereof, located upstream of the at least final reaction stage, fabricated from the lower temperature material and the lower temperature material is a high temperature alloy.

* * * * *